(No Model.)
E. T. CAMP.
SEED AND FERTILIZER DISTRIBUTER.
No. 352,117. Patented Nov. 9, 1886.
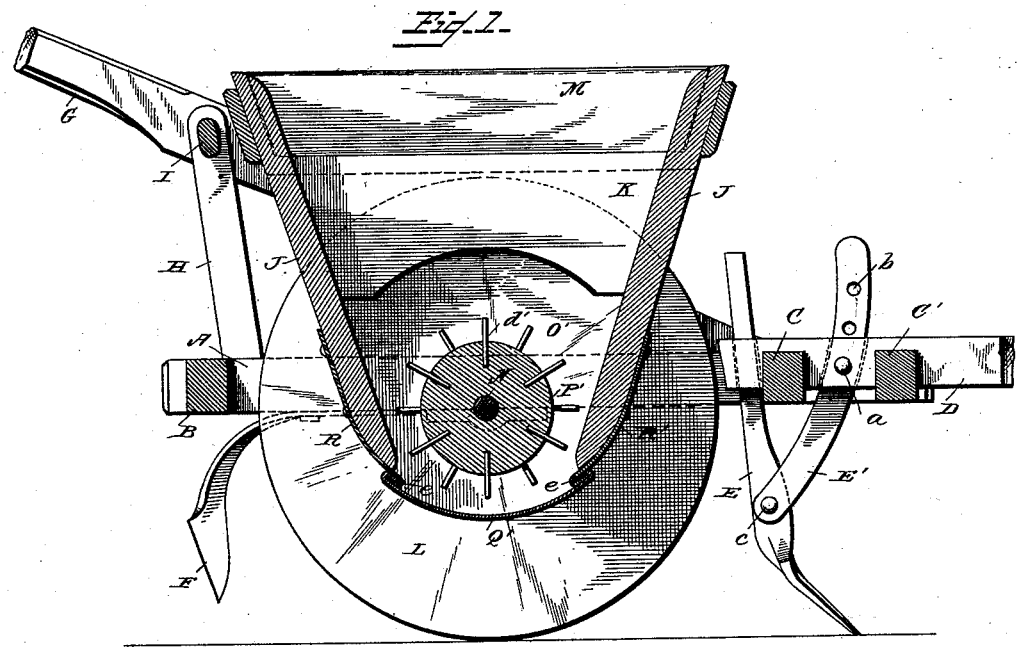
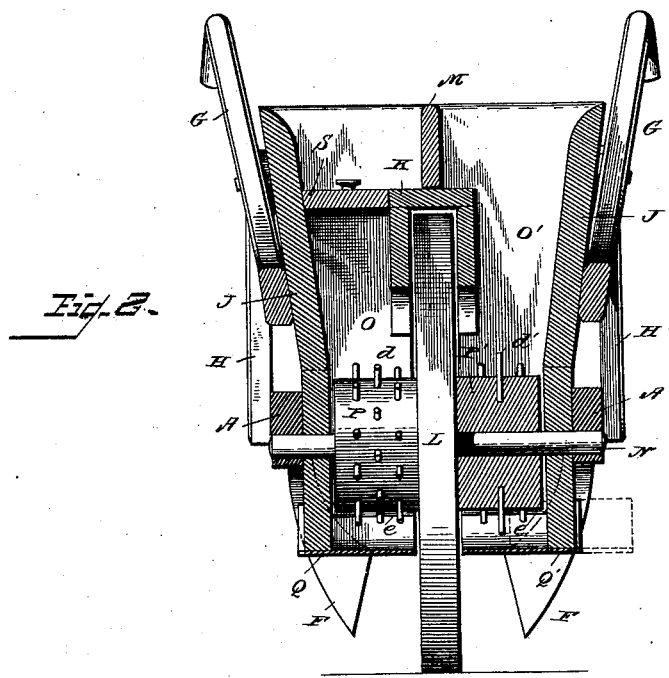
Witnesses
Inventor
Edmund T. Camp
By his Attorney

UNITED STATES PATENT OFFICE.

EDMOND THOMAS CAMP, OF VILLA RICA, GEORGIA.

SEED AND FERTILIZER DISTRIBUTER.

SPECIFICATION forming part of Letters Patent No. 352,117, dated November 9, 1886.

Application filed June 7, 1886. Serial No. 204,320. (No model.)

*To all whom it may concern:*

Be it known that I, EDMOND THOMAS CAMP, a citizen of the United States, residing at Villa Rica, in the county of Carroll and State of Georgia, have invented certain new and useful Improvements in Seed and Fertilizer Distributers; and I do hereby declare the following to be a full, clear, and exact description of the invention, such as will enable others skilled in the art to which it appertains to make and use the same.

My invention relates to a seed and fertilizer distributer in which the parts can be used to distribute either fertilizer or fertilizer and seed, as desired, and in which the furrow can be opened and afterward covered, and in which the wheel will form the dividing-partition between the two chambers and serve to cause the material to feed better than otherwise would be the case; and to such ends the invention consists in the construction and the combination of parts hereinafter particularly described, and then sought to be specifically pointed out by the claims.

In the accompanying drawings, forming a part hereof, Figure 1 is a vertical longitudinal section through the distributer on one side of the main wheel. Fig. 2 is a transverse vertical section through the distributer, looking from the front.

The frame of the distributer is composed of side bars, A, and transverse bars B, C, and C'. A bar, D, is connected to bars C and C', and this bar is slotted for the passage of the colter E and its brace E'. The colter may fit loosely in its slot, while the brace is secured to the bar D by a pin or bolt, a, passing through one of a series of holes, b, made in the bar. The bolt a will hold the colter to the desired adjustment, and the brace being hinged to the colter by bolt c, it will spread or close as the colter is raised or lowered, so as to conform to the adjustment without binding.

The coverers F are bolted to the rear of the side bars, A, and extend downwardly, and their opposite inner edges are slightly turned outward from each other, as shown in Fig. 1. These coverers extend down low enough to cover the furrow after it has been opened by the colter and the seed and manure dropped. They are bolted to the side bars, so as to be easily detached when desired.

The handles G are secured to the sides of the hopper and braced by uprights H and cross-bar I.

The hopper J converges or tapers from the top downwardly, and is divided in its upper portion by a boxing, K, which incloses the upper portion of the main wheel L, and by a removable partition, M.

In the lower part of the hopper is journaled the axle N, which carries the main wheel L, that separates the two compartments O and O' and forms a rotating partition or inner sides to the compartments below the boxing K. The boxing prevents the periphery of the wheel from carrying any material out of the compartments or any foreign matter into them, and the wheel forming a part of the inner walls of the compartments assists in agitating the material contained in the compartments. The axle on each side of the main wheel within the compartments is provided with wheels or rollers P and P', which are provided with teeth or projections $d\ d'$, which agitate the fertilizer and seed in the two compartments.

The bottom of the two compartments is composed of slides Q and Q', being curved, as shown, and flanged, so as to slide in the grooves e of the plates R R', secured to the front and rear of the hopper. By moving these slides outwardly, as indicated by dotted lines on one side of Fig. 2, the quantity of fertilizer or seed to drop can be regulated.

A cover, S, is provided to one of the compartments, so that when only fertilizer is to be dropped the seed-compartment can be closed, the removable partition taken out, and the fertilizer made to fill not only the other compartment, but also the enlarged area made by removing the partition, so that the fertilizer will then cover the whole of the upper portion of the hopper. When both fertilizer and seed are to be dropped, the removable partition is put in place, the cover taken off, and both compartments filled, so that both can be used together.

When distributing only fertilizer, the colter and coverers can be removed.

I have shown two compartments; but the feature of the wheel forming one side of the compartment can be employed in a machine of only one compartment with a single disintegrating tooth-roller in its bottom, as is obvious, and consequently I am not confined in these features to a double compartment.

I have shown and described what I consider the best form of the parts used, but do not mean to restrict myself thereto, as it is obvious that changes can be made without departing from my invention.

Having described my invention and set forth its merits, what I claim is—

1. The combination of the hopper, the boxing in the upper part thereof, the main drive-wheel forming a movable side to the compartment of the hopper and fitting in said boxing, the adjustable slide for regulating the quantity of material to be distributed, and the disintegrating-roller in the lower part of the hopper, substantially as described.

2. The combination of the hopper, the boxing in the upper part thereof, the main drive-wheel dividing the hopper into two compartments, the adjustable bottom slides, the disintegrating-rollers, the movable partition in the upper part of the hopper, and the cover to one of the compartments, substantially as described.

3. The combination, with the hopper having the disintegrating-rollers, main drive-wheel dividing the hopper into two compartments, and adjustable slide-bottoms, of the colter in front of said wheel fitting loosely in a frame, the brace hinged at its lower end to the colter and secured to the bar by an adjusting-pin, and the coverers at the rear of the hopper, substantially as described.

In testimony whereof I affix my signature in presence of two witnesses.

EDMOND THOMAS CAMP.

Witnesses:
S. L. CRAVEN,
A. J. CAMP.